United States Patent
Boissonneault et al.

(10) Patent No.: US 12,226,882 B2
(45) Date of Patent: Feb. 18, 2025

(54) BEARING AND SHAFT INSTALLATION TOOLING

(71) Applicant: PRATT & WHITNEY CANADA CORP., Longueuil (CA)

(72) Inventors: Martine Boissonneault, Saint-Constant (CA); Philippe Boro, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 15 days.

(21) Appl. No.: 18/053,562

(22) Filed: Nov. 8, 2022

(65) Prior Publication Data

US 2024/0149414 A1   May 9, 2024

(51) Int. Cl.
   *B25B 27/06*   (2006.01)
   *F16C 43/04*   (2006.01)

(52) U.S. Cl.
   CPC .............. *B25B 27/06* (2013.01); *F16C 43/04* (2013.01)

(58) Field of Classification Search
   CPC ........ B25B 27/06; B25B 27/062; F16C 43/04
   See application file for complete search history.

(56) References Cited

U.S. PATENT DOCUMENTS

| | | | | |
|---|---|---|---|---|
| 1,585,707 A | * | 5/1926 | Hartsock | B25B 27/062 29/263 |
| 2,036,782 A | | 4/1936 | Ullmo | |
| 2,964,841 A | * | 12/1960 | Farris | B25B 27/023 29/214 |
| 4,509,241 A | * | 4/1985 | Freeland | F16C 35/062 29/263 |
| 5,033,177 A | * | 7/1991 | Gathright | B25B 27/062 29/280 |
| 5,125,156 A | | 6/1992 | Witte | |
| 5,165,169 A | | 11/1992 | Boyce | |
| 5,226,208 A | * | 7/1993 | Gracey | F16C 35/062 29/265 |
| 5,355,574 A | * | 10/1994 | Zweekly | B25B 27/062 29/262 |

(Continued)

FOREIGN PATENT DOCUMENTS

DE   102021103668   3/2022

OTHER PUBLICATIONS

European Search Report issued on Apr. 9, 2024 for corresponding application No. 23208637.1.

*Primary Examiner* — Kyle A Cook
(74) *Attorney, Agent, or Firm* — NORTON ROSE FULBRIGHT CANADA LLP

(57) ABSTRACT

A tool for mounting a bearing and shaft subassembly in an aircraft engine component, including a rod extending from a first end to a second end and adapted to extend through a hollowed shaft, the rod having a shaft seating portion at the first end adapted to engage a first end of the shaft. A holder is engageable to the second rod end to receive a second end of the shaft. The holder is displaceable towards the shaft seating portion during engagement to the second rod end. At least one sleeve is adapted to wrap about a shaft outer surface, removably securable to the shaft, and having an end defining a bearing facing surface to axially engage the bearing. The holder is displaceable towards that surface to axially load the bearing against the sleeve and maintain the shaft between the holder and the shaft seating portion.

10 Claims, 8 Drawing Sheets

(56) References Cited

U.S. PATENT DOCUMENTS

| | | | |
|---|---|---|---|
| 5,386,630 A | 2/1995 | Fox | |
| 5,442,854 A | 8/1995 | Koltookian et al. | |
| 5,848,460 A * | 12/1998 | Rasmussen | B25B 27/06 29/263 |
| 8,757,890 B2 | 6/2014 | Baker et al. | |
| 9,605,736 B1 * | 3/2017 | Foshage | F16H 37/0826 |
| 10,151,343 B2 | 12/2018 | Rode | |
| 2008/0313888 A1 * | 12/2008 | Mueller | F16C 35/06 29/724 |
| 2012/0036691 A1 * | 2/2012 | Mueller | B25B 27/062 29/263 |
| 2014/0250650 A1 * | 9/2014 | Lee | B25B 27/062 29/259 |
| 2022/0381282 A1 * | 12/2022 | Fox-Mudge | F16B 37/0807 |

* cited by examiner

BEARING AND SHAFT INSTALLATION TOOLING

TECHNICAL FIELD

The disclosure relates generally to tooling for use with the assembly of components in an aircraft engine and, more particularly, to a tool or tool assembly used to install and handle bearing and shaft assemblies.

BACKGROUND

Bearing and shaft assemblies may be mounted in a housing of an engine component by interference fit and/or are designed with very tight assembly tolerances. In certain installation procedures, bearing and shaft assemblies may be inserted axially within a housing. Bearing and shaft assemblies may require pre-assembling before installation into the housing. Handling of shafts, bearings and bearing and shaft assemblies in the pre-assembled state during an installation procedure and/or engine overhaul may expose such bearings to potential impact and/or damages during handling. Manual alignment and positioning of a bearing and shaft assembly within a housing during an installation procedure may be challenging, especially with tight assembly tolerances and fit.

SUMMARY

According to a first aspect, there is provided a tool for mounting a bearing and shaft subassembly in an aircraft engine component, the bearing and shaft subassembly having a hollowed shaft extending from a first end to a second end along a shaft axis, and at least one bearing mounted on the hollowed shaft, the tool comprising: a rod extending from a first rod end to a second rod end, the rod adapted to extend through the hollowed shaft, the rod having a shaft seating portion at the first rod end, the shaft seating portion adapted to engage the first end of the hollowed shaft; a holder engageable to the second rod end, the holder adapted to receive the second end of the hollowed shaft, the holder displaceable towards the shaft seating portion during engagement to the second rod end; and at least one sleeve adapted to wrap about an outer surface of the hollowed shaft, the at least one sleeve removably securable to the hollowed shaft, the at least one sleeve having an end defining a bearing facing surface to axially engage the at least one bearing, and the holder being displaceable towards the bearing facing surface during engagement of the holder to the second rod end to axially load the at least one bearing against the at least one sleeve and maintain the hollowed shaft between the holder and the shaft seating portion.

According to a second aspect, there is provided a method for rotatably mounting a hollowed shaft in a housing of an aircraft engine component, the method comprising: pre-assembling at least one bearing and the hollowed shaft on a tool to obtain a bearing and shaft subassembly prior to inserting the bearing and shaft subassembly in the housing, the pre-assembling including: inserting a rod of the tool in the hollowed shaft; abutting a first end of the hollowed shaft with a first rod end; wrapping at least one sleeve of the tool about the hollowed shaft; abutting the at least one sleeve axially against at least an outer race of the at least one bearing; engaging a holder of the tool to a second rod end of the rod, the holder receiving a second end of the shaft; axially loading at least the outer race of the at least one bearing against the at least one sleeve with the holder; and inserting the bearing and shaft subassembly mounted on the tool in a bore of the housing.

BRIEF DESCRIPTION OF THE DRAWINGS

Reference is now made to the accompanying figures in which.

DETAILED DESCRIPTION

Figure 1:
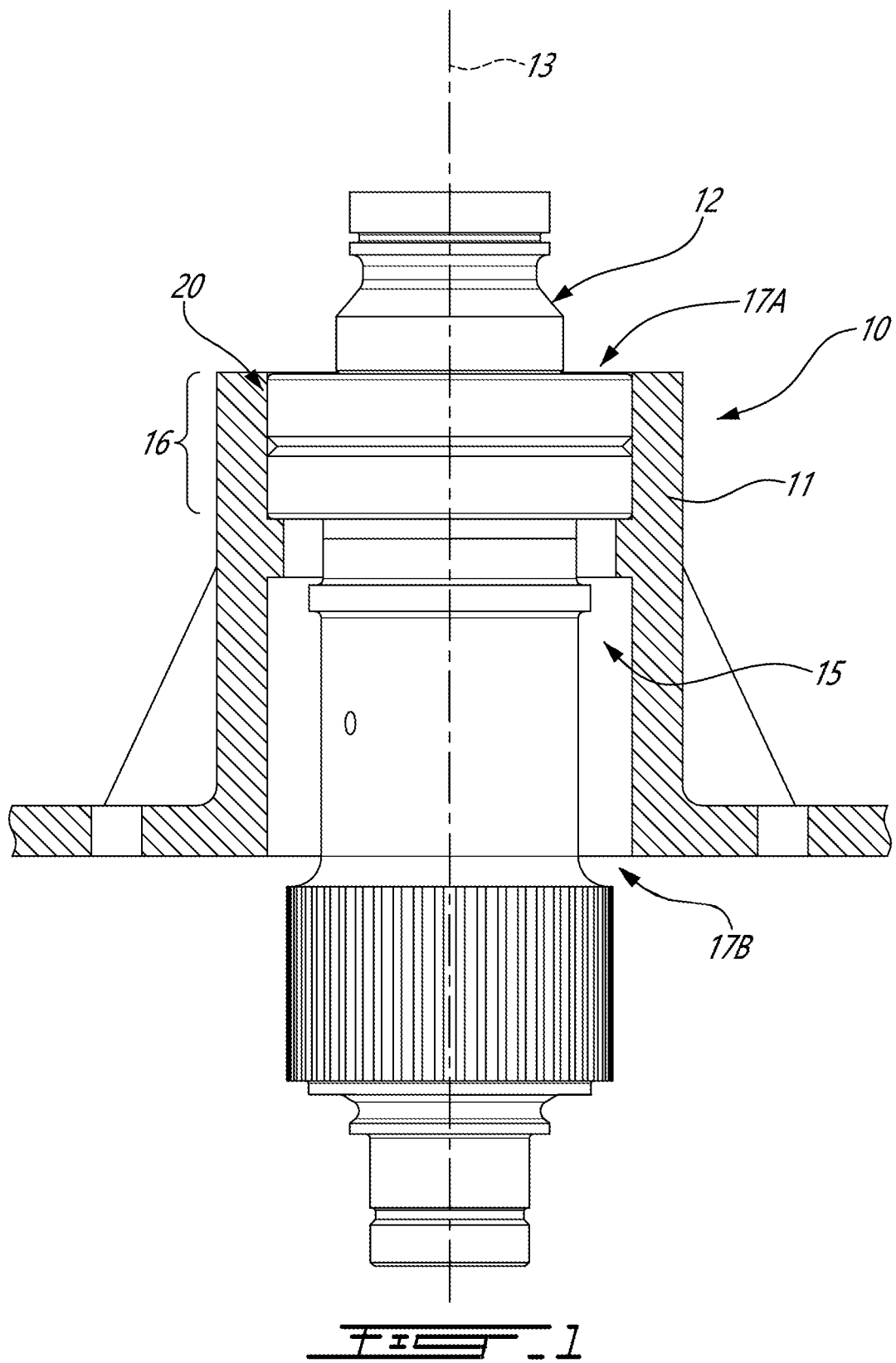
FIG. 1 is a schematic partial cross sectional view of an engine component having a bearing and shaft subassembly, according to an embodiment.

FIG. 1 illustrates schematically an engine component 10 having a housing 11 adapted to receive a shaft 12 for rotation about a shaft axis 13 within a bore 15 of the housing 11. In an embodiment, the engine component 10 may be a transmission, such as a reduction gearbox. The engine component 10 referred to in the present disclosure may be a component of an aircraft engine, such as gas turbine engine of a type preferably provided for use in subsonic flight, generally comprising in serial flow communication a fan through which ambient air is propelled, a compressor section for pressurizing the air, a combustor in which the compressed air is mixed with fuel and ignited for generating an annular stream of hot combustion gases, and a turbine section for extracting energy from the combustion gases. The aircraft engine may be a turboprop engine or a turbofan, for example.

The shaft 12 is rotatably coupled to the housing 11 via one or more bearings 16 interfacing between the shaft housing 11 and the shaft 12. In the example shown, the bore 15 of the engine component 10 extends through the housing 11. As shown, the bore 15 may define two openings 17A, 17B in the housing 11, on opposite faces of the housing 11 (e.g., exterior and interior faces or walls of the housing 11). In at least some cases, the shaft 12 and bearing(s) 16 may be pre-assemble prior to mounting into the housing 11. The shaft 12 and bearing(s) 16 may form parts of a bearing(s) and shaft subassembly 20, as will be further described later.

In at least some cases, the bearing and shaft subassembly 20 may be coupled to the housing 11 by interference fit. In order to install the bearing and shaft subassembly 20 in the housing 11 with such fit, the bearing and shaft subassembly 20 may be cooled prior to insertion within the housing 11 to cause thermal contraction. Such cooling may be obtained by putting the bearing and shaft subassembly 20 in a freezer or a ice container, for example. Thermal expansion of the bearing and shaft subassembly 20 may cause the subassembly 20 to remain in place within the housing 11 once back at room temperature. Installation of such bearing and shaft subassembly 20 may be challenging. Handling of such engine parts during an installation procedure and/or engine overhaul may expose such bearings to potential impact and/or damages during handling. In some applications, these engine parts may be handled manually. Manual alignment and positioning of a bearing and shaft subassembly 20 within a housing 11 during an installation procedure may be challenging, especially with tight assembly tolerances and fit, and where a relative position of the engine parts one with respect to the other has to be maintained.

A tool 30 which may also be referred to as a tool assembly, to facilitate the mounting of a bearing and shaft subassembly 20 in a housing of an engine component, as the housing 11 of the engine component 10, is described herein with reference to FIGS. 2-7.

Components of the bearing and shaft subassembly 20 may be pre-assembled and mounted to the tool 30 prior to insertion of the bearing and shaft subassembly 20 in the housing 11. As will be further described later, the tool 30 is adapted to maintain at least the shaft 12 and bearing(s) 16 in place one relative to the other, (axially and/or angularly, during insertion of the bearing and shaft subassembly 20 into the housing 11.

Figure 2:
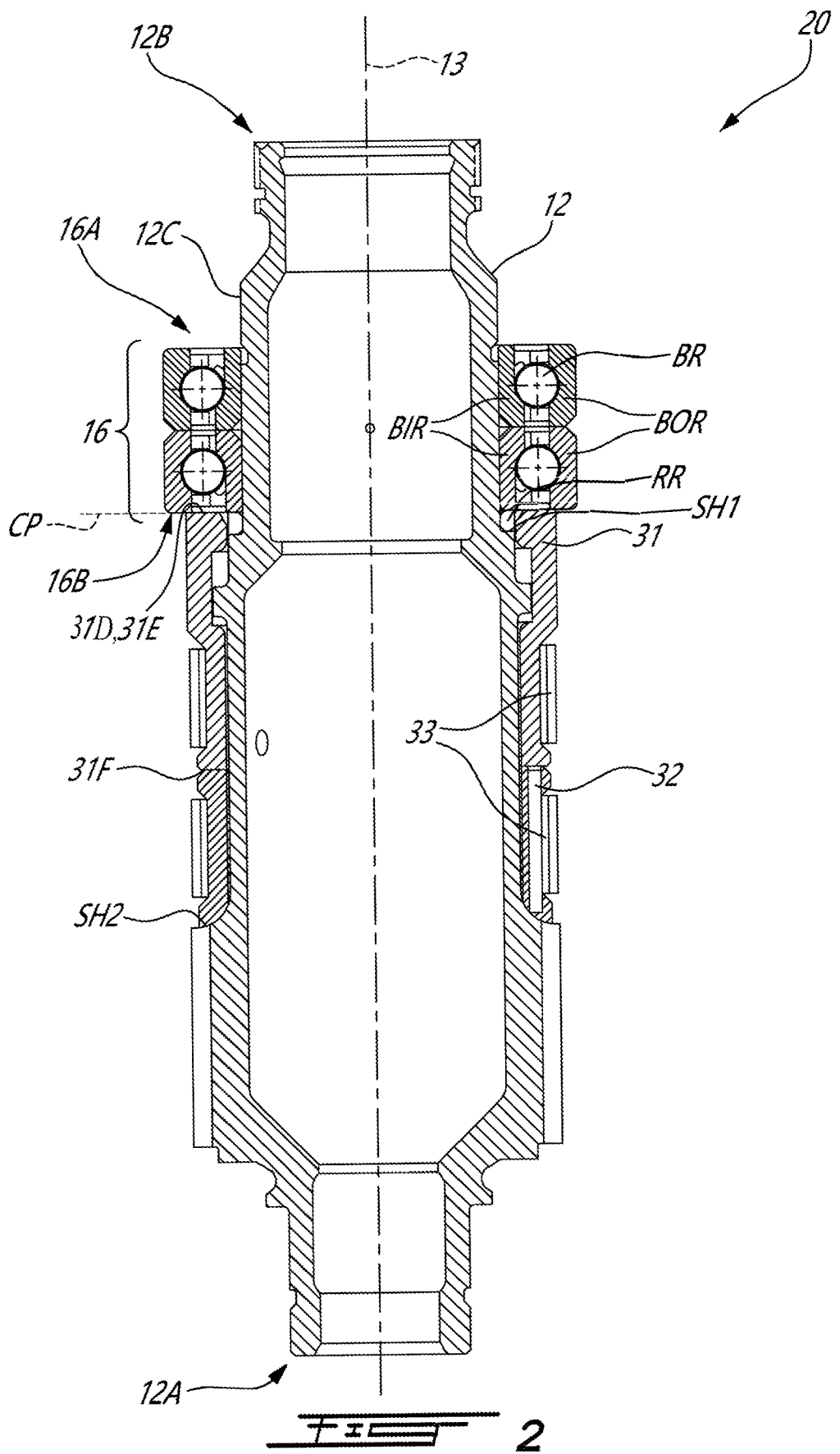
FIG. 2 is a schematic cross sectional view of the bearing and shaft subassembly of the engine component of FIG. 1, with sleeves forming parts of a tool, according to an embodiment.

An exemplary bearing and shaft subassembly 20 will be described with reference to FIG. 2, shown in a pre-assembled state. The pre-assembled state refers to a state where the bearing and shaft subassembly 20 is not yet installed in the housing 11. The bearing and shaft subassembly 20 may be mounted on the tool 30 (FIG. 4) prior to installation in the housing 11 (FIG. 1), as described later.

The bearing and shaft subassembly 20 includes a hollowed shaft 12 extending from a first shaft end 12A to a second shaft end 12B. The shaft 12 and shaft axis 13 are shown in FIG. 2 in an upright orientation. An upright position or orientation will be referred to later with respect to the orientation of the bearing and shaft subassembly 20 during installation. Such upright position or orientation may correspond to a generally vertical orientation (e.g., 90 degrees±30 degrees) with reference to a ground surface and/or surface of reference on which the engine component 10 may be placed during an installation procedure performed by a worker.

As shown, the subassembly 20 includes bearings 16 coupled to the shaft 12. In the embodiment shown, there are a plurality of bearings 16, here two bearings 16A, 16B mounted on the shaft 12 one adjacent another, in this case. There could be one or more bearings 16 in other examples.

The bearings 16A, 16B have inner races BIR, outer races BOR, and rolling elements BR in between them. The inner races BIR of the bearings 16A, 16B may be press-fitted onto an outer surface 12C of the shaft 12 in at least some embodiments. The inner races BIR may be slidingly engaged to the outer surface 12C of the shaft 12 in at least some other embodiments.

In at least some embodiments, as shown, the subassembly 20 may include a spacer RR extending about the shaft 12 and located axially between the inner race BIR of the bearing 16B, and a shoulder/plateau SH1 of the shaft 12. The spacer RR, which may also be referred to as an annular spacer, a collar, or a ring, for example. may be adapted to contact the inner race BIR of the bearing 16B. The spacer RR may be sized (e.g., thickness wise) so as to position the bearing 16B at a desired axial location along the shaft 12, away from the plateau SH1. In the position shown, the spacer RR may maintain the inner race BIR of the bearing 16B at an axial distance from the plateau SH1 of the shaft 12. Stated otherwise, the inner race BIR may rest axially against the spacer RR when the subassembly 20 is in the upright position. The inner races BIR and outer races BOR of the bearings 16A, 16B may not be self-maintained together when mounted on the shaft 12. The rolling elements BR may interface between them, but the inner races BIR and outer races BOR may not be fixed/coupled to one another. The inner races BIR and outer races BOR may be dissociated one with respect to the other if not physically maintained aligned by an external means (e.g., hands, tools, other components). As such, during installation, if the bearing and shaft subassembly 20 in a pre-assembled state is held in an upright position, without holding the bearing components together, the outer races BOR may not remain axially aligned with the inner races BIR, i.e., the components of the bearings 16A, 16B could fall apart or misalign.

In at least some embodiments, as shown, removable first and second sleeves 31, 32, may be mounted on the subassembly 20. These sleeves 31, 32 define parts of the tool 30 further described later. The sleeves 31, 32 are adapted to wrap about the outer surface 12C of the shaft 12 and, once secured to the shaft 12, the removable sleeves 31, 32 may block an axial movement of the bearings 16A, 16B in one direction along the shaft axis 13 ("downward" with respect to the orientation of the page). Stated otherwise, the bearings 16A, 16B may abut axially against the sleeve 31 immediately adjacent the bearings 16A, 16B, so as to maintain the axial location of at least the outer races BOR of the bearings 16A, 16B, relative to the shaft 12. The sleeves 31, 32 may cover a part of the outer surface 12C of the shaft 12 once installed thereon. The sleeves 31, 32 may protect at least portions of the shaft 12 against impact from external objects during handling of the bearing and shaft subassembly 20.

Figure 3A:
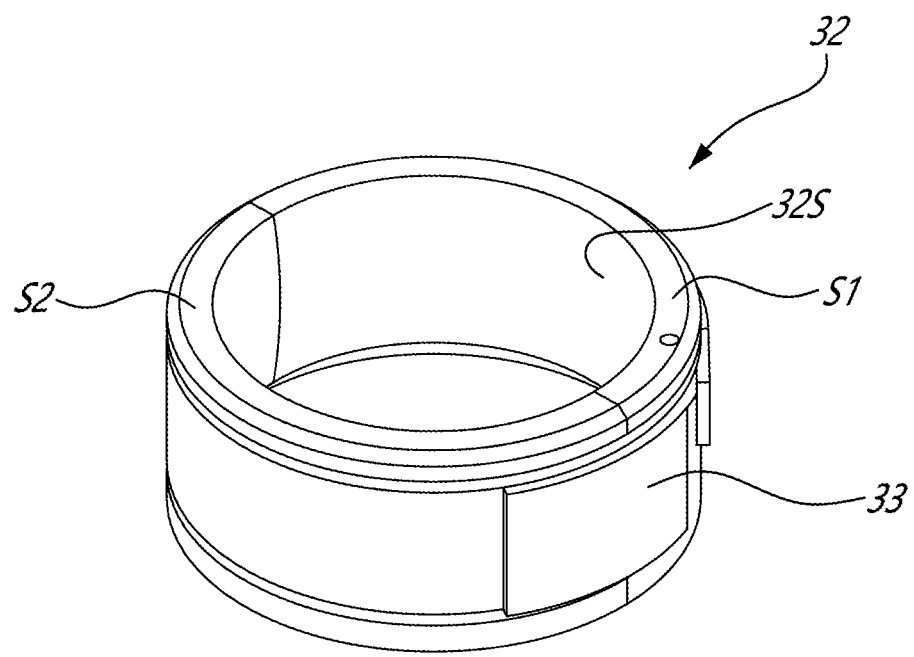
FIG. 3A is a perspective view of an exemplary sleeve of the tool, according to an embodiment.
Figure 3B:
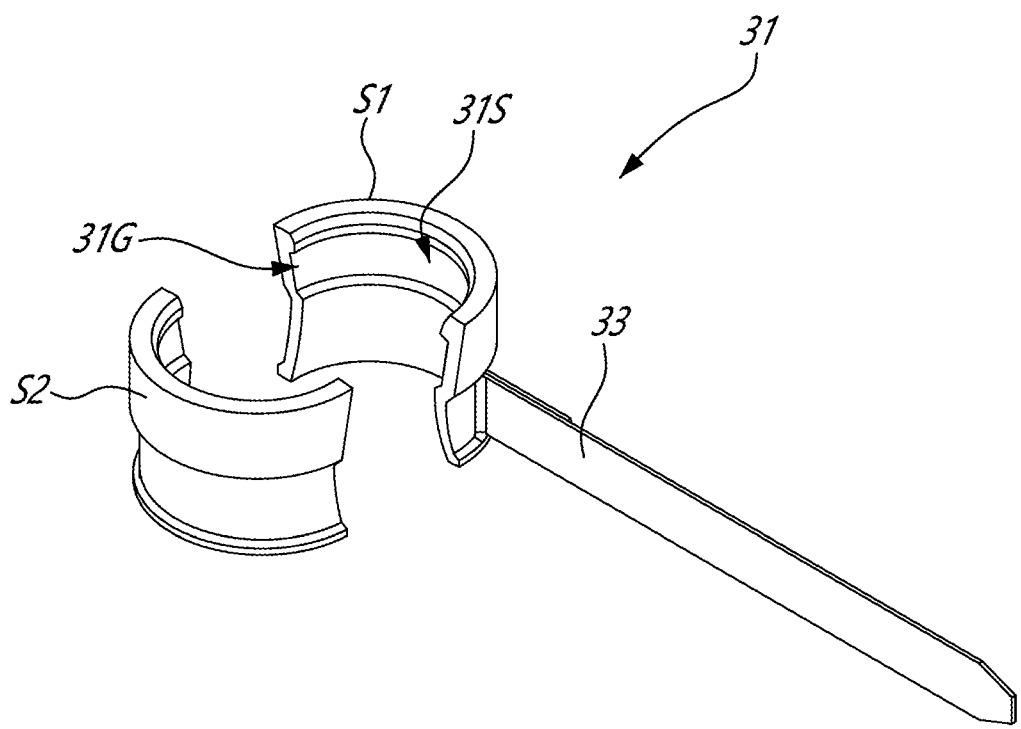
FIG. 3B is an exploded perspective view of another exemplary sleeve of the tool, showing parts of said sleeve.

FIGS. 3A-3B shows perspective views of such sleeves 31, 32. FIG. 3B shows the first sleeve 31 that is immediately adjacent the bearing 16B in FIG. 2, and FIG. 3A shows the second sleeve 32. As shown, the sleeves 31, 32 have a ring shape. The sleeves 31, 32 may be openable and/or segmented to facilitate installation on the outer surface 12C of the shaft 12. For example, in at least some embodiments, as shown, the sleeves 31, 32 each include two segments S1, S2 of a ring. In the embodiment shown, the segments S1, S2 are two halves of a ring, but they may have different dimensions in other cases. The sleeves 31, 32 may be tightened onto the outer surface 12C of the shaft 12 with a strap 33 wrapping about the sleeves 31, 32, or other fastening means. In one example, the strap 33 is a hook-and-loop strap to facilitate removal/installation, but other fastening means could be contemplated (e.g., clips, clamps, collars, etc.). For installation on the shaft 12, a first one of the sleeves 31, 32 may be mounted about the outer surface 12C of the shaft 12. Such sleeve, here sleeve 31 may then be secured on the outer surface 12C of the shaft 12 by strapping. A second one of the sleeves 31, 32 may then be secured on the outer surface 12C, in a similar or other manner (e.g., other types of fastener). The sleeves 31, 32 have an inner surface 31S, 32S facing towards the outer surface 12C of the shaft 12. Each sleeve 31, 32 may have a distinct shape so as to fit about the outer surface 12C of the shaft 12 at their respective desired locations. The inner surface 31S, 32S may be shaped so as to mate or receive features defines at the outer surface 12C of the shaft 12. For example, as shown in FIG. 3B, the sleeve 31 has a groove 31G defined in its inner surface 31S. The groove 31G may receive a bulging portion of the shaft 12. This is only one possibility, as there may be other features on the outer surface 12C requiring such mating or receiving features on the sleeve 31.

Returning to FIG. 2, the sleeve 31 may be secured onto the shaft 12 in a position where the outer race BOR of the bearing 16B immediately adjacent the sleeve 31 may abut against an end 31E, i.e. a bearing abutment end, of the sleeve 31, as shown. The end 31E defines a bearing facing surface 31D that may abut against the bearing 16B. At such location, the sleeve 31 may block one degree of freedom in translation of at least the outer races BOR of the bearings 16A, 16B, i.e., one direction along the shaft axis 13. The end 31E of the sleeve 31 and/or its bearing facing surface 31D, may define a contact plane CP with the outer race BOR of the bearing 16B. The contact plane CP faces towards the holder 37 (described later referring to FIG. 4). The sleeve 31 may support the outer race BOR of the bearing 16B circumferentially along the outer surface 12C of the shaft 12.

Blocking axial movement of the outer race BOR with the sleeve 31, as shown, with the shaft 12 in an upright position, may maintain alignment between the inner race BIR, rolling elements BR and outer race BOR of the bearing 16B. In the embodiment shown, the bearing 16A, adjacent the bearing 16B abutting against the sleeve 31, contacts axially that bearing 16B. As shown, the outer race BOR of the bearing 16A rests against the outer race BOR of the adjacent bearing 16B. The sleeve 31 may therefore maintain either by direct contact or by a serial engagement of adjacent bearings (or other interfacing components), the relative position between the inner races BIR, rolling elements BR, and outer races BOR of the plurality of bearings 16A, 16B, when the bearing and shaft subassembly 20 is oriented in an upright position, as shown.

During installation of the first sleeve 31 on the shaft 12, the strap 33 of the first sleeve 31, here including two segments S1, S2 movable one with respect to the other to straddle the shaft 12, may be tightened so as to wrap about the segments S1, S2 and secure them about the outer surface 12C of the shaft 12. In some cases, in this state, the sleeve 31 may still be movable axially along the shaft 12, even if the strap 33 is tightened. The sleeve 31 may be slid axially along the shaft axis 13, on the outer surface 12C of the shaft 12 until it comes into contact with the outer race BOR of the bearing 16B. The second sleeve 32 may be mounted to the shaft 12 similarly as discussed above with respect to the first sleeve 31. The second sleeve 32 may be mounted to the shaft 12 serially with respect to the first sleeve 31. The second sleeve 32 may be in axial engagement with an end of the first sleeve 31 (an end 31F opposite the end 31E contacting the bearing 16B). The second sleeve 32 may further maintain the first sleeve 31 at its axial location in order to further limit movement of the first sleeve 31 and/or maintain the outer races BOR of the bearings 16A, 16B in alignment with their respective inner races BIR.

In the embodiment shown, the second sleeve 32 axially engages a shoulder SH2 defined at a periphery of the shaft 12. As shown, once mounted to the shaft 12, the second sleeve 32 may abut against the end 31F of the first sleeve 31 at a first end 32E thereof on one side, and on the shoulder SH2 of the shaft 12 at a second end 32F thereof on an opposite side of the second sleeve 32. Stated otherwise, the second sleeve 32 may abut both on the first sleeve 31 and on the shoulder SH2 of the shaft 12, thereby further maintaining the bearings 16A, 16B at their desired location when the bearing and shaft subassembly 20 is in an upright position, as shown.

In the embodiment shown, the tool 30 include two sleeves 31, 32, to protect part of the outer surface 12C of the shaft 12 and maintain the bearings 16A, 16B axially in one axial direction along the shaft axis 13. There could be one or more than two sleeves in other embodiments. Other components could be contemplated to support the outer races BOR of the bearings 16A, 16B, such as a retainer ring, an annular clip, for example, secured to the shaft 12 about its outer surface 12C. Blocking movement of the outer races BOR of the bearings in one axial direction, as described herein with the sleeves 31, 32 could be made non-continuously along the end/periphery of the bearings 16A, 16B. Stated otherwise, while the sleeves 31, 32 described herein and the contact plane CP between the outer race BOR of the bearing 16B and the sleeve 31 may support the outer races BOR continuously along a full circumference of the shaft 12, the bearing outer races BOR could be supported punctually, for instance at two, three, four or more selected locations along their circumference.

Figure 4:
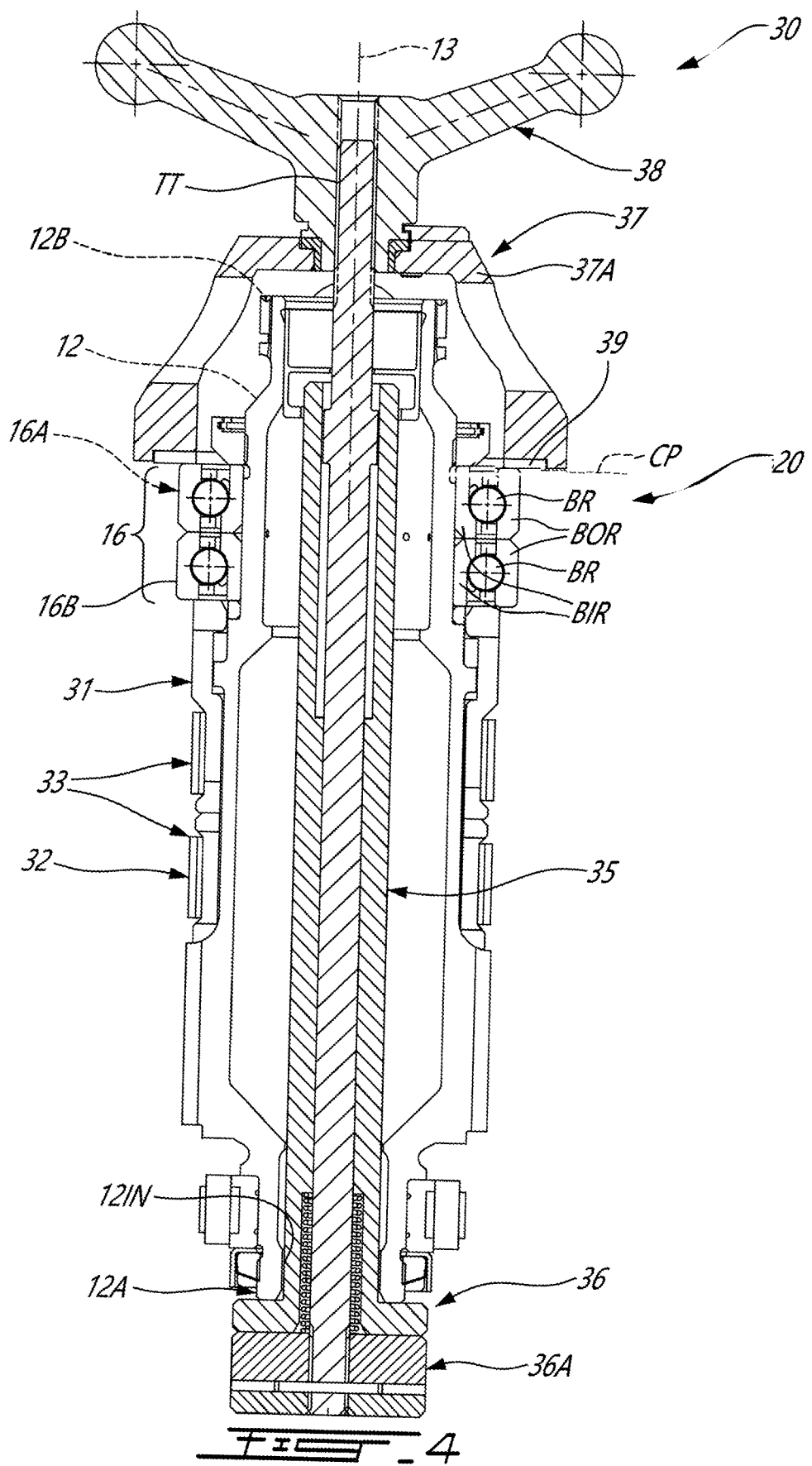
FIG. 4 is a schematic cross sectional view of the bearing and shaft subassembly of the engine component of FIG. 1 mounted on the tool, according to an embodiment.

Referring to FIG. 4, other components of the tool 30 will be described. As shown, the tool 30 includes a rod 35 adapted to extend through the shaft 12. The rod 35 has a shaft seating portion 36 (or simply "seat"). The rod 35 may also include a base 36BA adapted to abut against the seat 36, as will be further described later. The seat 36 is at a first end 36A of the rod 35. The rod 35 has a second end 36B opposite the first end 36A having the seat 36. As shown, the second end 36B may be threaded. In use, the rod 35 may be inserted through the shaft 12 of the bearing and shaft subassembly 20. The seat 36 may axially abut against the first shaft end 12A, with or without intermediary components between the seat 36 and the shaft end 12A. In the embodiment shown, the seat 36 directly abuts against the shaft end 12A. Stated otherwise, the shaft end 12A contacts the seat 36. The contact between the shaft end 12A and the seat 36 may be continuous along a full circumference of the shaft 12. The shaft end 12A may lie flat on the seat 36. The seat 36 may have a flat surface to abut against the shaft end 12A. Flat surface is only one example, as the seat 36 may have a surface having a shape that is complementary with a surface of the shaft end 12A, without being flat, e.g., non-flat shaft end 12A. The seat 36 may be larger or have other suitable shape so as to engage not only the end 12B of the shaft 12, but also portions of the outer surface 12C of the shaft 12, for example.

The rod 35 may be in sliding engagement with at least part of the shaft 12. As shown, a circumference of the rod 35 may contact an inner surface 121N of the shaft 12. In FIG. 4, this is shown close to the first shaft end 12A. The rod 35 may be sized so as to engage at least part of the inner surface 121N of the shaft 12. The rod 35 may have a transverse/radial dimension corresponding to that of at least part of the interior of the shaft 12. The rod 35 may have an interference fit or sliding fit with the shaft 12. During insertion of the rod 35 in the shaft 12, such fit may allow for a better axial alignment of the rod 35 and the shaft 12 and/or maintain concentricity therebetween.

As shown, the rod 35 extends axially beyond the first shaft end 12A and the second shaft end 12B. A holder 37 is engageable to the second end 36B of the rod 35. In embodiments where the rod has threads TT at the second end 36B, the holder 37 may be threadingly engageable to the rod 35. The holder 37 may thus be engaged to the threads TT of the rod 35 and tightened so as to receive the second shaft end 12B. The holder 37 is displaceable towards the seat 36 as it engages the rod 35. The shaft 12 may thus be sandwiched axially between the seat 36, at one end 12A of the shaft 12, and the holder 37 (or holder 37 and intermediary piece as the alignment plate 39 described later), at the opposite end 12B. The shaft 12 may thus be maintained between the seat 36 and the holder 37 when it is mounted on the tool 30. The holder 37 may contact the second shaft end 12B, or only receive part of the second shaft end 12B. In the embodiment shown, the holder 37 is shaped so as to extend circumferentially about the second shaft end 12B. Stated otherwise, the holder 37 may define a cup/concavity in which the second shaft end 12B may be inserted. The holder 37 may thus protect at least partially the second shaft end 12B against impact from external objects during handling of the bearing and shaft subassembly 20. The holder 37 may engage the bearings 16 and/or at least apply an axial load on the bearings 16 when tightened. Upon engaging the holder 37 to the second end 36B of the rod 35, the holder 37 is displaced towards the bearing facing surface 31D at the end 31E of the sleeve 31 and axially load the bearings 16A, 16B against the sleeves 31, 32. In this state, the bearings 16A, 16B are axially maintained on the shaft 12 between the holder 37 and the sleeve 31.

Figure 4A:
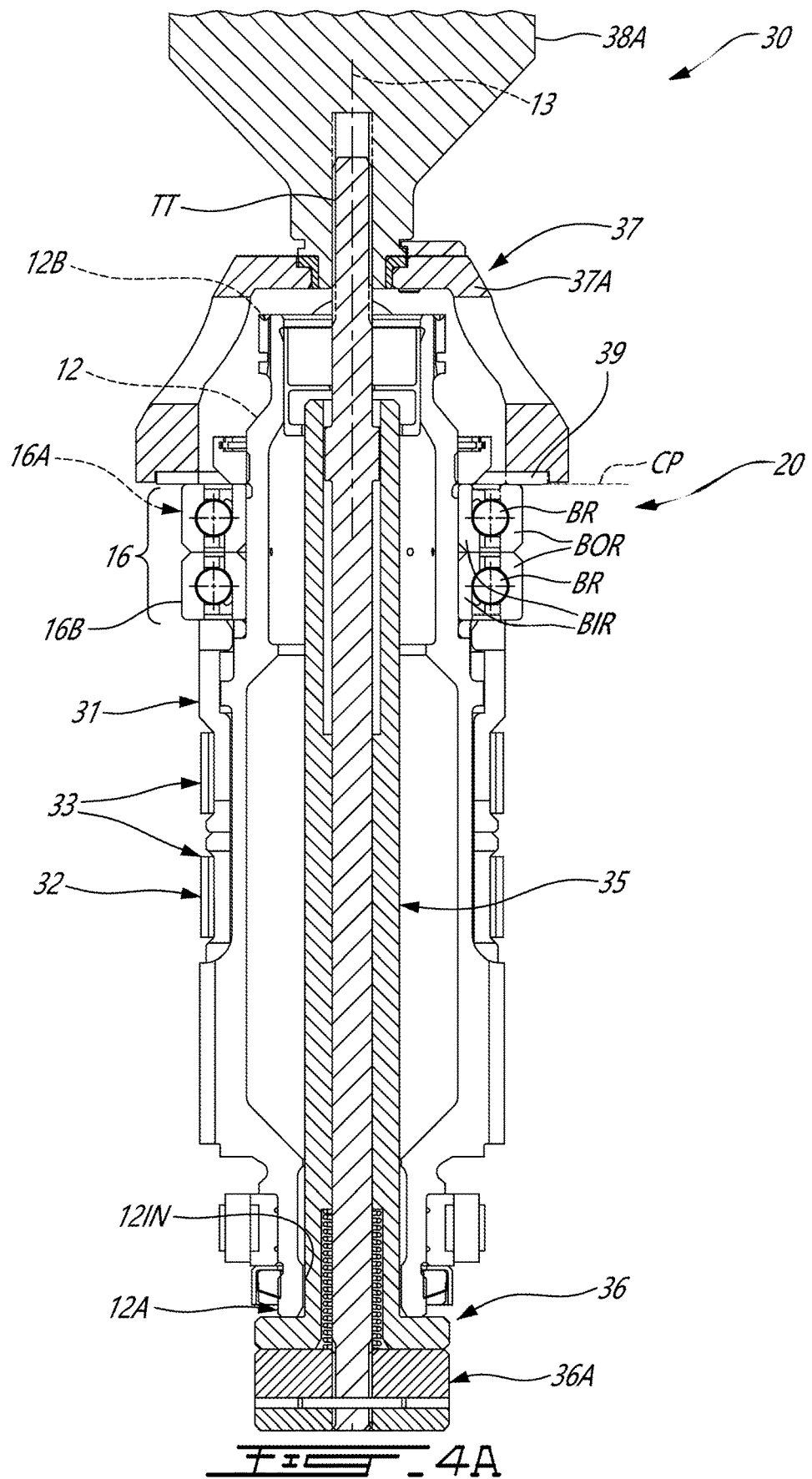
FIG. 4A is a schematic cross sectional view of the bearing and shaft subassembly of the engine component of FIG. 1 mounted on a variant of the tool shown in FIG. 4.

In at least some embodiments, the holder 37 has a manual actuator, here referred to as a holder handle 38, rotatable so as to threadingly engage/disengage the holder 37 to/from the threads TT of the rod 35. As shown, the holder handle 38 may have threads to engage/disengage the threads TT of the rod 35. The holder handle 38 may be pivotally mounted to a remainder of the holder 37. Stated otherwise, The holder handle 38 may be pivotally mounted onto a main body 37A of the holder 37. As such, when the holder handle 38 is pivoted relative to the main body 37A during threading onto the rod 35, the main body 37A may not rotate. Stated otherwise, the holder handle 38 may solitarily rotate relative to the main body 37A of the holder 37 during the threading as the main body 37A advances toward the bearings 16 during tightening. This may be the case in at least some embodiments, as the main body 37A and the holder handle 38 could be a single piece in other cases. The holder handle 38 may include a ratchet mechanism to facilitate the threading engagement with the threads TT of the rod 35. In the embodiment shown, the handle holder 38 has a pair of members extending in opposite directions from a center of the holder handle 38, so as to define "wings" and facilitate handling and/or manual tightening of the holder 37 on the rod 35. The holder handle 38 may have other shapes, such as a hook shape (e.g., U-shape, ring shape, etc.) for lifting, for example. The holder handle 38 is only one possibility for at least some embodiments of the tool 30. While manual tightening/untightening of the holder 37 is contemplated in at least some embodiments, automatic/motorized tightening/untightening could also be contemplated in other embodiments. For example, a variant of the tool 30 is shown in FIG. 4A. Similar features of the tool 30 are not repeated herein for conciseness and bear the same reference numbers for ease of reference. It should be understood that the features described herein with respect to the tool 30 may also apply to the variant shown in FIG. 4A.

As shown in FIG. 4A, a powered actuator 38A may be engageable to the second end 36B of the rod 35. In some embodiments, the powered actuator 38A may be a motor (e.g., electric, pneumatic and/or hydraulic motor). The powered actuator 38A may apply a torque so as to engage threads TT of the rod 35 during tightening of the holder 37. The powered actuator 38A may be a handheld drill, as one example. Other power device could be contemplated to tighten/untighten the holder 37 onto the rod 35. The powered actuator 38A may form part of, or be a separate part from, the holder 37.

Returning to FIG. 4, an alignment plate 39 interfaces between the holder 37 and the bearings 16. The holder 37 may press against the alignment plate 39, which in turn may press against the bearings 16 so as to clamp the bearings 16 axially between the sleeves 31, 32 and the holder 37. In this state, the bearing and shaft subassembly 20 may be "locked" on the tool 30, with the bearings 16 at a fixed axial location onto the shaft 12. As shown, the alignment plate 39 may contact an end of the bearing 16B when the bearing and shaft subassembly 20 is "locked" on the tool 30, as in FIG. 4. The alignment plate 39 may be considered part of the bearing and shaft subassembly 20 or the tool 30. Indeed, once the bearing and shaft subassembly 20 is secured to the housing 11, the alignment plate 39 may remain with the bearing and shaft subassembly 20. Other aspects of the alignment plate 39 will be described later.

Figure 5:
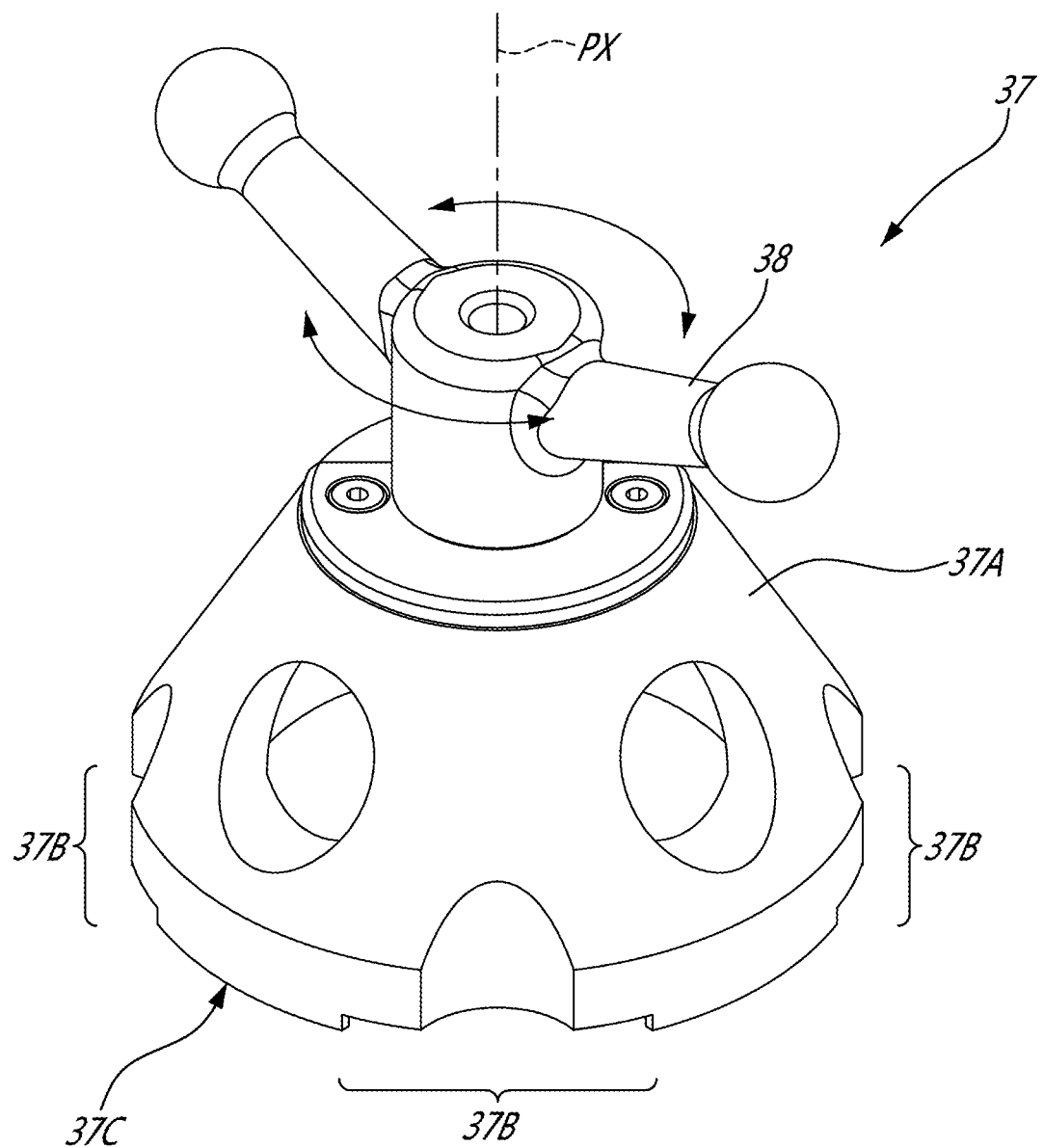
FIG. 5 is a perspective view of a part of the tool shown in FIG. 4, according to an embodiment.

Referring to FIG. 5, the holder 37 according to an embodiment is shown, with its main body 37A and the holder handle 38. As shown, the holder handle 38 is pivotable about a pivot axis PX relative to the main body 37A. The pivot may include a bearing, e.g., journal bearing, ball bearing, between the main body 37A and the holder handle 38, for example. The pivot axis PX may be aligned with the shaft axis 13 when the subassembly 20 is on the tool 30. As shown, at a bottom end 37C of the holder 37 (bottom end, meaning the end of the holder 37 facing towards the bearings 16 when the bearing and shaft subassembly 20 is on the tool 30), the holder 37 has keying features 37B. The keying features 37B are adapted to engage with the alignment plate 39. The alignment plate 39 engaged with the keying features 37B may secure rotationally the alignment plate 39 relative to the holder 37. Stated otherwise, the keying features 37B define an anti-rotation mechanism for the alignment plate 39 when said plate 39 engage the holder 37. Stated otherwise, the main body 37A of the holder 37 and the alignment plate 39 may be rotationally locked one with respect to the other when the bearing and shaft subassembly 20 is mounted on the tool 30.

Figure 6:
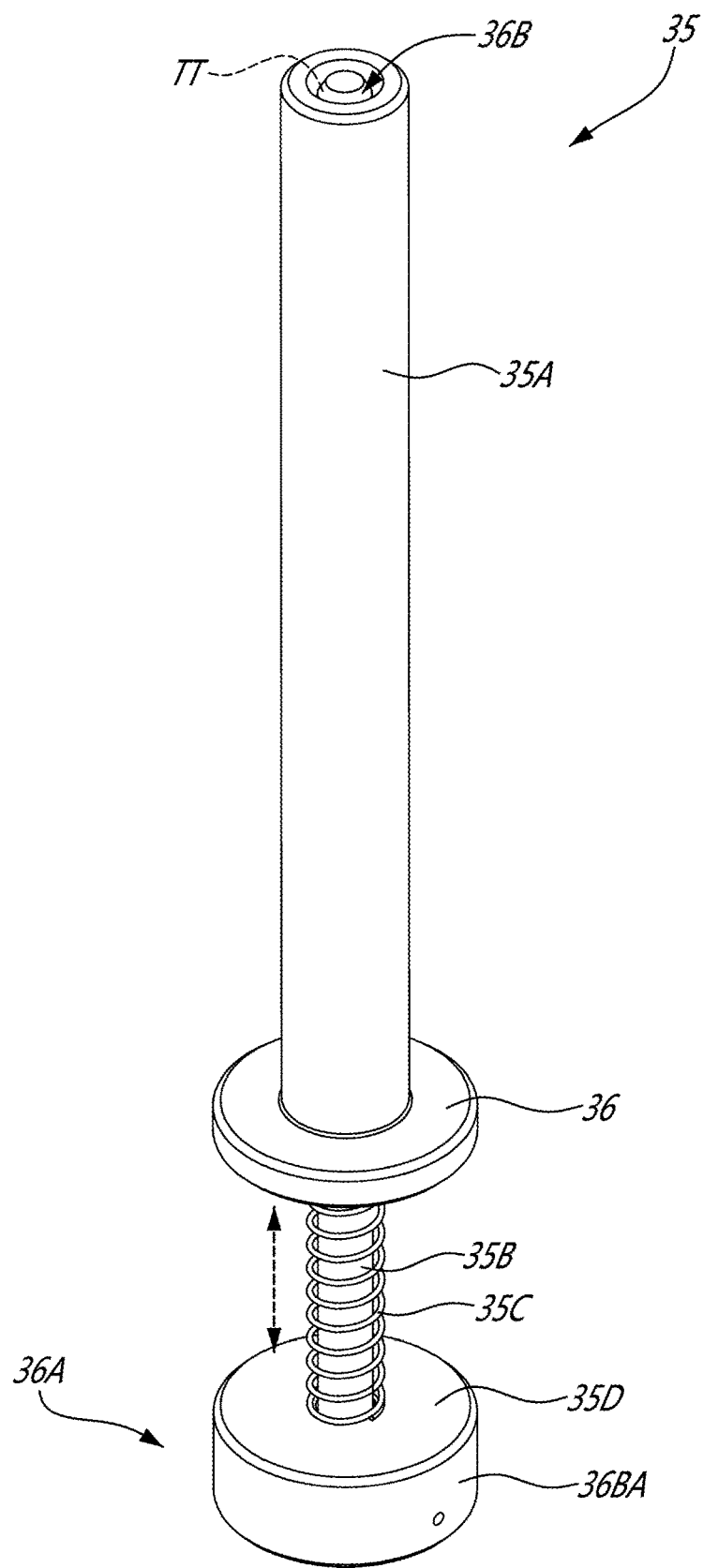
FIG. 6 is a perspective view of a part of the tool shown in FIG. 4, according to an embodiment.

Referring to FIG. 6, the rod 35 of the tool 30 is shown in isolation. In the example shown, the rod 35 is segmented into a first part 35A axially engaged to a second part 35B. The first and second parts 35A, 35B are concentric one with respect to the other. The first part 35A is hollowed. The first part 35A may be referred to as a tubular part of the rod 35. The second part 35B extends through the first part 35A. A biasing member 35C between the first and second parts 35A, 35B may bias the first part 35A in a biased state, in which the end 36B of the rod 35 is covered. In the biased state, the threads TT are covered at the end 36B of the rod 35 (the threads TT being on the second part 35B of the rod 35, as shown). The biasing member 35C may be a spring, such as a coil spring, in at least some embodiments, In an unloaded state, the threads TT of the rod 35 may be protected against impact. When the rod 35 is inserted through the shaft 12 of the bearing and shaft subassembly 20 and the shaft 12 abuts against the seat 36 of the rod 35, the biasing member 35C may be loaded (compressed), and the first part 35A of the rod 35 may be retracted to uncover the threads TT of the rod 35 at a periphery thereof on the second part 35B. The second part 35B of the rod 25 includes an abutment portion 35D. The abutment portion 35D has a wall face that faces towards the seat 36. In the embodiment shown, the abutment portion 35D is part of the base 36BA of the rod 35. As shown, the base 36BA is radially larger than an immediately adjacent portion of the second part 35B. In the retracted state, the seat 36 abuts against the abutment portion 35D of the second part 35B of the rod 35. When the threads TT of the rod 35 are uncovered, the holder 37 may threadingly engage the end 36B of the rod 35 to secure, axially, the bearing and shaft subassembly 20 between the seat 36 and the holder 37.

Figure 7:
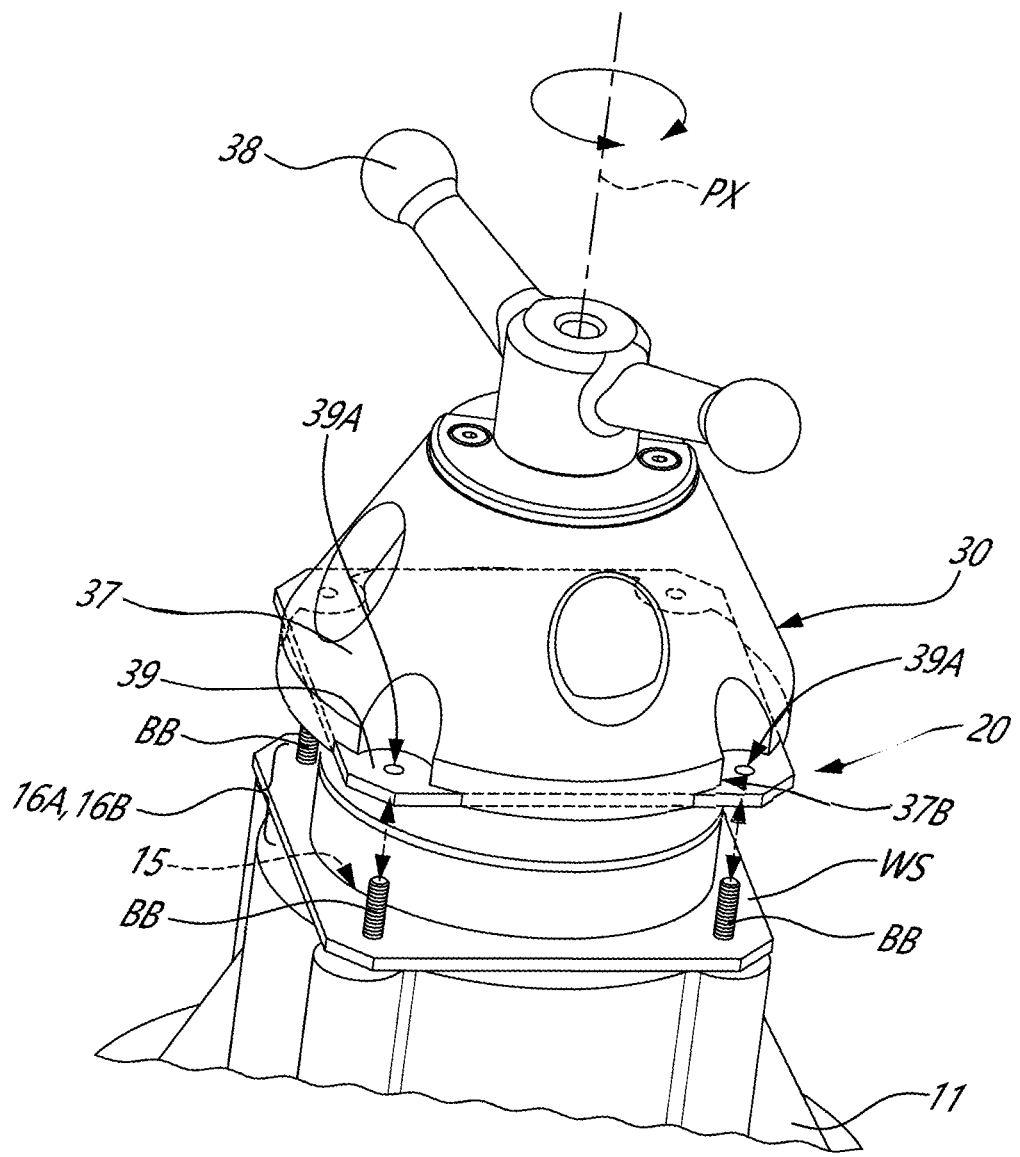
FIG. 7 is a perspective view showing part of the engine component of FIG. 1, with the tool and the bearing and shaft subassembly on the engine component.

In use, the tool 30 with the bearing and shaft subassembly 20 loaded thereto may be handled using the holder handle 38, if present. Referring to FIG. 7, the bearing and shaft subassembly 20 may be inserted in the bore 15 of the housing 11 (e.g., transmission housing, such as a reduction gearbox, or other engine component housing). As shown, the alignment plate 39 has alignment holes 39 engageable with threaded rods BB (e.g., bolts). Once the bearing and shaft subassembly 20 is inserted in the housing 11, the alignment plate 39 may be seated against a wall surface WS of the housing 11, with the threaded rods BB engaged through the alignment holes 39A. The alignment plate 39 may then be secured to the housing 11 via screws or other fasteners (not shown) tightened on the threaded rods BB. The keying features 37B of the holder 37 may engage the alignment plate 39 so as to prevent angular movement between the holder 37 and the alignment plate 39 during installation.

After installation, the holder 37 may be disengaged/disassembled from the rod 35 of the tool 30. The rod 35 of the tool 30 may then be removed from the shaft 12, from a side opposite the side of insertion of the bearing and shaft subassembly 20 to the housing 11. As the rod 35 is being removed from the shaft 12, pressure of the shaft 12 on the seat 36 of the rod 35 may be released, and the biasing member 35C of the rod 35 may be unloaded. As the biasing member 35C is being unloaded, the first part 35A of the rod 35 may move over the threads TT of the second part 35B of the rod 35 so as to cover the threads TT. In embodiments where the rod 35 is in sliding or interference fit engagement with the shaft 12 (as described above), the base 36A may serve as a pulling feature to facilitate removal of the rod 35 from the shaft 12.

As described herein above, in at least some cases, the bearing and shaft subassembly 20 may be coupled to the housing 11 by interference fit. In order to install the bearing and shaft subassembly 20 in the housing 11 with such fit, the bearing and shaft subassembly 20 may be cooled prior to insertion within the housing 11 to cause thermal contraction. In use, the subassembly 20 may be installed on the tool 30. Both the subassembly 20 and the tool 30 may be cooled, in a controlled environment such as a freezer, or in a ice bath, for example. Thermal contraction may thus occur, and the tool 30 may then be handled to align and insert the subassembly 20 in place within the housing 11.

A method for rotatably mounting a hollowed shaft 12 in a housing 11 of an aircraft engine component 10 will now be described with aspects derived from the features described herein with respect to the subassembly 20 and the tool 30. The method includes pre-assembling at least one bearing 16, 16A, 16B and the hollowed shaft 12 on a tool 30 to obtain a bearing and shaft subassembly 20 prior to inserting the bearing and shaft subassembly 20 in the housing 11. The pre-assembling includes inserting a rod 35 of the tool 30 in the hollowed shaft 12, abutting a first end 12A of the hollowed shaft 12 with a first rod end 36A, wrapping at least one sleeve 31, 32 of the tool 30 about the hollowed shaft 12, abutting the at least one sleeve 31, 32 axially against at least an outer race BOR of the at least one bearing 16, 16A, 16B, engaging a holder 37 of the tool 30 to a second rod end 36B, the holder 37 receiving a second end 12B of the hollowed shaft 12, and axially loading at least the outer race BOR of the at least one bearing 16, 16A, 16B against the at least one sleeve 31, 32 with the holder 37. Once the bearing and shaft subassembly 20 is mounted on the tool 30, it can be inserted in a bore 15 of the housing 11.

Other aspects of the method can be derived from the features described herein with respect to the subassembly 20 and the tool 30. For example, abutting the first end 12A of the hollowed shaft 12 with the first rod end 36A may include abutting axially the first end 12A against a shaft seating portion 36 of the rod 35, and/or abutting the first end 12A of the hollowed shaft 12 with the rod 35 may include retracting a tubular part 35A of the rod 35 to uncover threads TT at the second rod end 36B. Engaging the holder 37 of the tool 30 to the second rod end 36B may include threadingly engaging the holder 37 to the second rod end 36B. The method may also include cooling the bearing and shaft subassembly 20 prior to inserting the bearing and shaft subassembly 20 in the housing 11. The tool 30 may also be cooled with the bearing and shaft subassembly 20 mounted thereto. Axially loading at least the outer race BOR of the at least one bearing 16, 16A, 16B may include clamping the at least one bearing 16, 16A, 16B axially between the at least one sleeve 31, 32 and an alignment plate 39. Abutting the at least one sleeve 31, 32 axially against at least the outer race BOR of the at least one bearing 16, 16A, 16B includes abutting a first sleeve end 31E of the first sleeve 31 axially against the outer race BOR of the at least one bearing 16, 16A, 16B, and axially engaging a second sleeve 32 with a second sleeve end 31F of the first sleeve 31. This may include blocking an axial movement of the outer race BOR of a first bearing 16B and an outer race BOR of a second bearing 16A in one direction along a shaft axis 13 so as to maintain an axial location of at least the outer race BOR of the first bearing 16B and the outer race BOR of the second bearing 16A relative to the hollowed shaft 12.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the bearing and shaft subassembly 20 and the tool 30 have been described in an application involving a housing 11 of an aircraft engine component, bearing and shaft subassemblies as the one described herein could be used in other applications. The tool 30 may thus be used in other applications than aircraft engine components assembly, overhaul and/or engine maintenance, for example. Yet further modifications could be implemented by a person of ordinary skill in the art in view of the present disclosure, which modifications would be within the scope of the present technology.

The invention claimed is:

1. A tool for mounting a bearing and shaft subassembly in an aircraft engine component, the bearing and shaft subassembly having a hollowed shaft extending from a first end to a second end along a shaft axis, and at least one bearing mounted on the hollowed shaft, the tool comprising:
   a rod extending from a first rod end to a second rod end, the rod adapted to extend through the hollowed shaft, the rod having a shaft seating portion at the first rod end, the shaft seating portion adapted to engage the first end of the hollowed shaft;
   a holder engageable to the second rod end, the holder adapted to receive the second end of the hollowed shaft, the holder displaceable towards the shaft seating portion during engagement to the second rod end; and at least one sleeve adapted to wrap about an outer surface of the hollowed shaft, the at least one sleeve removably securable to the hollowed shaft, the at least one sleeve having an end defining a bearing facing surface to axially engage the at least one bearing, and the holder being displaceable towards the bearing facing surface during engagement of the holder to the second rod end to axially load the at least one bearing against the at least one sleeve and maintain the hollowed shaft between the holder and the shaft seating portion;

wherein the rod has a first part and a second part axially engaged to the first part, the first and second parts concentric one with respect to the other, the first part being a tubular part, the second part extending through the first part, a biasing member between the first part and the second part, the first part axially retractable relative to the second part, in a retracted state, the first part uncovering a periphery of the second end of the rod on the second part, the biasing member biasing the first part in a biased state in which the periphery of the second rod end of the rod on the second part is covered by the first part.

2. The tool as defined in claim 1, wherein the at least one sleeve includes a first sleeve and a second sleeve, the first sleeve and the second sleeve adapted to wrap about the outer surface of the hollowed shaft, the first sleeve and the second sleeve removably securable to the hollowed shaft, the first sleeve having a first sleeve end which define the bearing facing surface, the second sleeve mountable to the hollowed shaft serially with respect to the first sleeve, the second sleeve axially engaging a second sleeve end of the first sleeve that is opposite the first sleeve end.

3. The tool as defined in claim 1, wherein rod has threads at the second rod end has threads, the holder threadingly engageable with the threads.

4. The tool as defined in claim 1, further comprising a powered actuator engageable to the second rod end, the powered actuator tightening the holder onto the rod.

5. The tool as defined in claim 1, wherein the holder has keying features at a bottom end thereof, the keying features adapted to engage with an alignment plate, the alignment plate rotationally securable to the holder via the keying features.

6. The tool as defined in claim 1, wherein the holder is shaped so as to extend circumferentially about the second end of the hollowed shaft.

7. The tool as defined in claim 1, wherein the at least one sleeve includes a first segment and a second segment, the first segment and the second segment securable one to another via a fastener.

8. The tool as defined in claim 7, wherein the fastener is a strap, the strap wrapping about the first segment and the second segment of the at least one sleeve.

9. The tool as defined in claim 1, wherein the holder includes a main body and an actuator pivotable about a pivot axis relative to the main body, the actuator engageable with the second rod end.

10. The tool as defined in claim 9, wherein the actuator is a manual actuator pivotally mounted to the main body, the pivot axis aligned with the shaft axis when the bearing and shaft subassembly is mounted on the tool.

* * * * *